Patented Nov. 30, 1943

2,335,324

UNITED STATES PATENT OFFICE 2,335,324

POLISH

Joseph A. Tumbler, Baltimore, Md.

No Drawing. Application November 15, 1938,
Serial No. 240,536

6 Claims. (Cl. 106—7)

This invention relates to chemical compositions, and more particularly, relates to novel polishes for lacquered or enamelled surfaces such as are found on automobile bodies and the like, and also relates to a novel process for making the said compositions.

On exposure to the action of the weather, all oleo-resinous, nitro-cellulose lacquer, and synthetic resin coatings or finishes deteriorate. This deterioration is more particularly due to the action of the ultra-violet portions of the sun-light rays from sunshine, and to a lesser extent is also due to the action of rain, wind and its accompanying dust.

The manifestation of this deterioration is exhibited as a decrease in gloss or luster, by the appearance of "bloom" or efflorescence, and by cracking, checking or chalking of the surface layer of the finish. These surface conditions are such, that they materially alter the appearance of a finish, causing colored coatings to appear either faded or darkened, and decreasing the transparency of clear finishes.

Thus the weathered finish is pictured as having a very erose surface and discontinuous structure. Loosened surface pigment particles have left pits and mounds. Cracks have been widened and deepened, producing the appearance of a more or less weathered mud flat. The structure of the embrittled and hardened finish below the surface is cracked by temperature change and vibration so that it has interfaces of cleavage intersecting in all directions. This makes the relatively optically homogeneous or transparent material a much lighter color due to the light reflected from cleavage interfaces below the surface. This lightening of color is analogous to the whiteness of snow, composed of transparent crystals.

All of the above manifestations result from oxidation or reduction. The term "oxidation" having by common usage been descriptive of the mentioned types of coating-failure, it will be used in speaking of finish-failures in the following text, but always differentiating, by the use of quotation marks, from chemical oxidation, which it also referred to in the present application.

The primary function of a polish is to remove as much as is possible of the "oxidized" or weathered finish which is loosely adherent to the surface, and thereafter to impregnate and coat the surface with a material which will fill and bridge over the pits, cracks or crevices and produce a uniformly hard, dry and lustrous surface.

It is also a desirable quality of a polish, to produce a surface which is of a protective nature, in that it will serve to diminish the speed with which "oxidation" progresses.

Besides, "oxidation," which proceeds mainly at the finished surface, there are other changes which go deeper into the finish and which may be remedied. One of these is the continued polymerization of oils used in finishes. This results in brittleness and in loss of elasticity. In lacquers, the evaporation of plasticizers, e. g., di-butyl-phthalate, etc., also results in brittleness, and loss of adhesion and flexibility.

A further function of a good polish is to penetrate the substance of the dried out finish itself, restoring the properties of elasticity and resilience.

There are many liquid materials which might be applied to a weathered finish to achieve the results just described. Varnishes, solutions of synthetic or natural resins, drying or other fatty oils, or even solutions of nitrocellulose function in this way. The antiquated, acid-emulsion polish containing either varnish or linseed oil stabilized by butter of antimony produces a finish of this type. However, such materials are invariably sticky. After applying them to a surface with a cloth, a smeary finish is produced which it is practically impossible to rub dry and which holds lint from the cloth and gathers dust and dirt.

The more efficient of these materials are the resin solutions and some blown oils. These more efficient materials possess light refractive properties very similar to those of the commonly used finishes. Upon their penetrating a crack, cleavage interface or by filling a pit, they appear to unite the discontinuous substance of the finish, restoring the lustre and original color. Such materials solve the problem of restoring optical homogeneity to the finish. They can also be selected to give films which dry, either by evaporation of solvents or by air oxidation, to give hard, protective films. They cannot, however, be applied simply and easily to give smooth surfaces. Painting with a brush or daubing with a cloth gives most unsatisfactory results as regards smoothness. Spraying of solutions is practised as a restorative and protective measure for finishes, but only experienced and skilled operators can secure satisfactory results by this method of application.

Heretofore it has been proposed to use an emulsion of mineral oil in which an abrasive is suspended which loosens and assists in the removal of oxidized particles, leaving a film of mineral oil on the surface. The film of mineral oil cannot become a part of the lacquered surface, and accordingly is gradually lost by volatilization and absorption in a cloth wiping over the surface.

It is essential that a good polish have a high refractive index, similar to that of the oils or resins and nitrocellulose found in the finish itself, in order to secure satisfactory depth and lustre. Otherwise scratches and pits will not be hidden and other surface irregularities will show up the surface film as being superimposed. Similarly of light refractivity of the polish and of the finish results in optical uniformity and invisibility of any dividing line between the substance of one and the other.

I have discovered that castor oil, especially air blown castor oil, which is a plasticizer for nitrocellulose lacquers and other oil and resin-containing compositions, also possesses high surface tension compared with other oils. A film of castor oil formed over the irregular surface tends to smooth itself out, reducing the interstices and other unevenesses. The smooth film thus obtained has gloss and lustre, comparable with that of new finishes.

Castor oil is a fluorescent substance and accordingly absorbs ultra-violet rays, preventing these destructive rays for reaching and injuring the lacquered surface. At the same time, it is readily polymerized, becoming harder upon exposure, retaining its smooth transparent nature, becoming more resistant to ultra-violet transmission.

Castor oil decreases the water permeability of films comprised of nitrocellulose and its addition to a polish for surface coated with nitro-cellulose lacquers materially aids in prolonging the life of such coatings because water is particularly destructive to lacquer finishes.

I have found that I can form a new and improved polish by employing in lieu of the castor oil above described, a combination of a castor oil and a resin. The castor oil may either be raw or blown castor oil. The resin which I employ should be completely soluble in the castor oil or miscible therewith. Resins which I have found usable are, for example, pontianak copal, partially oxidized Manila copal; or a resin derived from a by-product of a native pine tree, having the following characteristics:

a. Insoluble in petroleum hydrocarbons
b. Completely soluble in alcohol
c. Having a melting point above 100° centigrade
d. Being commercially available in one of its modifications under the trade name "Vinsol."

The percentage in which the resins are combined with the castor oil to yield my new and improved polish ranges between 10% of the resin and 90% of the castor oil up to 35% resins and 65% castor oil. The resins which I particularly example above are not the only resins which I may employ. Any resin, natural or synthetic which is soluble in or miscible with castor oil and which is insoluble in or immiscible with petroleum hydrocarbons which I employ as the vehicle for this polish element may be used.

Although I here state that the resin must be insoluble in the petroleum hydrocarbons, this is necessary because I prefer to employ petroleum hydrocarbons as the carrier or vehicle for the castor oil or resin. If I desire to use another carrier, the qualifications for the resin is that it be soluble or miscible with the castor oil with which it is combined and insoluble in the carrier employed.

As examples of the synthetic resins which I may employ, I enumerate broadly the condensation products as, for example, phenol formaldehyde, urea formaldehyde, glyptal resins, phthalic anhydride-ricinoleic acid resins and many other natural and synthetic resins of different classes.

By employing this combination of castor oil and resins as the polishing element, I find that the polish dries into a harder, drier and more durable coating than when I employ castor oil by itself. The castor oil polish of my previous invention suitably acts to soften and smooth the surfaces to be polished. The added resins which I now employ give a good body to this new polished surface that more closely resembles the permanency of the original surface. The combination of castor oil and resin gives a very lustrous finish, free from oiliness or greasiness. The action of the included resin counteracts to a certain extent the oiliness of the castor oil which has certain objections. By employing 10% of resin with the castor oil, I provide a polish that is easy to apply and which provides new and unexpected results.

It is to be understood that the structure of my polish comprises a composition in the form of an oil and water emulsion in which the water is the major body acting as a continuous phase which contains dispersed petroleum distillate in the form of a discontinuous phase and dispersed in the petroleum distillate and immiscible therein is the castor oil and resin polishing ingredients above described. The resin is soluble in the castor oil but insoluble in the petroleum distillate and in the water.

Instead of using simply castor oil and resin, I may employ castor oil and resin and an alcohol containing more than three carbon atoms. When using resins either natural or synthetic to replace pale blown castor oil, when it is carried in a petroleum hydrocarbon, the resins which are useful are restricted to those classes which are soluble in amyl or higher alcohol but insoluble in the petroleum hydrocarbons. These resins may be exemplified in the case of natural resins by Manila or pontianak, by "run" kauri or Congo copals, which latter two gums are representative of treated natural resins, and to synthetic resins consisting of modified phenol-formaldehyde resin, or glycerol phthalate resin, which are soluble in amyl or higher alcohol and insoluble in petroleum hydrocarbons. These resins whether natural, treated natural, or synthetic are used in about 50% solution in amyl or higher alcohol, and such solution used to replace blown castor-oil shown in my United States Patent No. 2,136,402.

The composition containing the castor oil and resin dispersed in the petroleum hydrocarbon which is carried in water is preferably passed through a colloid mill to break up and disperse the particles. This dispersion acts to homogenize the mixture so that there is little tendency for the separated globules to conglomerate or clog. Further, the finely divided particles more effectively act as polishing ingredients.

The extent to which these particles are finely divided determines the stability of the emulsion.

It is an object of my invention to provide a novel polish.

It is another object of my invention to provide a polish comprising as a polishing ingredient castor oil and a resin.

It is a further object of my invention to provide a novel polish comprising as a polishing ingredient castor oil and a resin suspended in a carrier which is dispersed in water.

It is a further object of my invention to provide a novel polish comprising a resin suspended in a carrier which is dispersed in water.

Further objects of my invention will be apparent from the description which follows:

Castor oil is the film-forming material referred to generally above. It is highly adherent and penetrating and its refractive index is of the same order as that of lacquer or enamel finishes. It also resembles the general group of oils and other highly refractive liquids mentioned above in that it cannot be applied alone simply and easily for it holds lint from the cloth and is too completely removed by continued rubbing with a dry cloth to give much of a protective film. However, in combination with a resin, it is dispersed along with about three times its volume of an immiscible light mineral oil in water.

In use, when the polish is applied to the surface, the water largely evaporates, and a mixture of castor oil and resin and mineral oil are rubbed over and into the surface. The castor oil is highly adherent and sticks to the finish, filling cracks and pits and because of the selective wetting of the finish by the castor oil, it displaces the mineral oil leaving the latter as a second film over and on top of the castor oil film. This film of mineral oil acts as a lubricant to permit massaging of the castor oil and resin into more intimate contact with the surface in rubbing without actual contact of the sticky castor oil film with the polishing pad. In this way a continuous, penetrating, restorative and protective film is easily produced and with very little effort.

The excess of mineral oil is absorbed by the polishing cloth leaving a very smooth, highly lustrous finish.

In these preparations, the water in which the oils are dispersed performs the role of a carrier. This dispersion serves in the twofold purpose of providing dilution for ready use and to insure uniform mixing of the castor oil and resin and mineral oil so that consistent results may be obtained.

A suitable dispersion of castor oil and resin in mineral oil may be obtained by means of a suitable protective colloid, such as a small amount of China-wood oil. Moreover, dispersions of castor oil in a semi-solid, as petroleum have been made which give good results and are stable. The inclusion of water permits a certain amount of cleaning action which is not obtained with straight oil mixtures.

Blown castor oil can be variously obtained by blowing to give products of viscosities ranging from that of raw castor oil about 130 secs., Saybolt, at 100° F., or less to gummy solids and these results can be duplicated by other treatments of castor oils than blowing to give the same physical and chemical products. Thus, although castor pale blown oil, which has a viscosity of above 400 secs., Saybolt, at 100° F., and which is described as an oxidized oil, gives the best results, it is not necessary that the oil be of this particular type. Raw or heavier blown castor oils may be used to give polish films which give more or less lustre and more or less tackiness, respectively.

Instead of blowing castor oil, it may be chemically treated or processed. The treatments are:
1. Treatment by nitration.
2. Treatment with sulphur chloride.
3. Hydrogenation of raw or blown oil, partial or complete. Completely hydrogenated castor oil would not have sufficient penetrating power for best results on automobile or other enamel or lacquer finishes, whereas partial hydrogenation will reduce the stickiness—which is the main object of the polish.

Pale blown castor oil may also be replaced by oils of other origin than the castor bean. Croton oil has properties closely resembling those of castor oil, and a similar constitution. It is the only other member of the "castor oil group" or "ricinoleic acid group" of oils. Rapeseed and other oils can be processed by treatment with sulphur chloride or by hydrogenation to give oils which are insoluble in mineral oils and which have great affinity for finishes.

Although I mention the specific use of pale blown castor oil in our preferred formulae, it should be understood that other material of high refractive index, immiscible with the lubricant and capable of being applied in a dispersed state to form glossy films may be used. Such materials would embrace castor oil condensed with polybasic acids to form viscous, highly light refractive compounds. Other oils derived from seeds or fruits of plants in the ricinus group—such as croton oil are examples of materials.

Although I have spoken here of the polishing element as being a mixture of castor oil and a natural or synthetic resin, it is within the scope of my invention to provide as a polishing element a resin alone. In that event my polish comprises resin in any desired form suspended in a medium, such as petroleum hydrocarbon, which in turn is dispersed in water. In this polish the resin acts similarly to a combination of resin and castor oil above described or to the castor oil per se described in my former application. The resin thus suspended as a polish element can be applied to refinish resinous or plastic surfaces with excellent results. Certain plastics such as cellulosic derivatives alone or in combination with preferably non-volatile solvents may also be employed as polishing elements.

Other products that may be used in lieu of castor oil are synthetic materials such as resins derived from the condensation of polybasic acids and polyhydric alcohols with or without modification with fatty acids; synthetic materials derived from the condensation of phenolic bodies and aldehydes; drying and semi-drying oils polymerized by heat, or chemical means to form substantially non-tacky films when sulphur chloride to render the substantially insoluble in petroleum derivatives, or vegetable oils hydrogenated to reduce tackiness after preliminary polymerization, also natural resins may be used.

These resins may be used per se by themselves as polishing agents or mixtures of such resins may be employed suspended in the hydrocarbon carrier.

In general the pale blown castor oil or its alternative must satisfy the following requirements:

1. It must be immiscible in mineral oil; have a viscosity of at least 150 secs. at 100° F.; not over 1000 secs., preferably 400 to 500 secs.
2. It must have a high refractive index, comparable to that of resins, oils and nitrocellulose.
3. It must be compatible with or soluble in materials composing finishes.
4. Weather resistant, non-volatile, light resistant, (any change due to weathering being of a constructive nature).
5. High surface tension and film-forming properties—to permit leveling.

6. Good wetting properties and penetration—to insure maximum absorption.

There are a few liquid materials which are, like castor oil, essentially insoluble in mineral oil. These are mostly solvents, either volatile or non-volatile, without any great film forming properties and without sufficient viscosity when used alone. However, these liquids have great penetration and affinity for finishes and the non-volatile ones are solvent plasticizers for such finishes. These solvents may be used to cut the viscosity of certain resins and castor oil, or of various blown castor oils so that the resulting blend has properties optimum for practical polishing. A list of such solvents is as follows:

Volatile:
1. Lactic esters, ethyl, butyl, amyl, etc.
2. Furfural and furfuryl alcohol Non-volatile:
1. Methoxyethylphthalate
   Ethoxyethylphthalate
2. Triacetin (also possibly diacetin)
3. Glyceryl tribenzoate It will be obvious that this list may be extended.

Moreover, certain solvents, though miscible with mineral oil as well as castor oil, if included in a mixture of the two oils are preferentially absorbed by the castor oil phase. The solvents of this type, as far as my investigation has revealed, are the aliphatic alcohols of four carbon atoms or more, i. e., butyl, amyl, hexyl, heptyl, octyl, alcohols.

There are available solvents that might be used to thin either blown castor oil or combinations of resins and castor oil but which are unsuitable for use in the presence of water due to their great affinity for water.

There are also some resins that are soluble in castor oil and whose castor oil solutions can be substituted for blown castor oil. Such solution increases the body of the oil considerably so that either raw oil must be used or, if blown oil is used, some of the above-mentioned solvents or thinners must be included to reduce the viscosity of the polishing film for practical purposes. Such resins are:

1. Bakelite resins known by the registered trade-mark "Bakelite," 0–25% in raw castor oil without thinners. Give good results; limited by high cost; increases durability of film.
2. Resins, occurring naturally or derived from natural products such as shellac, pontianak and sandarac, and a treated natural resin derived from pine wood by extraction and heat treatment to yield a product having the following characteristics:

| | |
|---|---|
| Melting point_____degrees centrigrade__ | 115 |
| Acid No_____ | 100 |
| Saponification No_____ | 158 |
| Unsaponifiable matter_____per cent__ | 6.5 |
| Petroleum naphtha (insoluble)____do____ | 98.5 |
| Toluol (insoluble)_____do____ | 60 |
| Petroleum ether (insoluble)_____do____ | 98.7 |
| Ash _____do____ | 0.04 |

Hereinafter I am referring to this product by its common trade name as "Vinsol Resin." 0–30% is dissolved in raw oil without thinners. Its film is more smeary than straight castor oil films, but might be commercially acceptable.

3. Certain glyceryl phthalate resins soluble in castor oil. "Glyptals" and "rezyls" are generally not compatible with castor oil, though certain ones are.

4. A phthalic anhydride-ricinoleic acid resin.

It should be understood that these resins can be used alone in suitable solution, or in combination one with another with raw or blown castor oil. "Vinsol" resin is "a hard, black resin that is derived from pine wood. It is believed to consist chiefly of highly oxidized and highly polymerized abietic acid and terpenes."

When I employ a polish comprising castor oil, a resin and alcohol containing more than three carbon atoms in suspension, I prefer to employ no more than a total of 10% of resin solution in the formulation. I have found that the lower percentages give the greatest facility in application and in polishing.

The mineral oil can vary considerably but gives best results within certain limits. Preferably the oil of petroleum origin should have physical characteristics as below:

| | |
|---|---|
| Gravity_____ | Over 32° Bé., preferably high |
| Viscosity_____ | 62–70 secs., Saybolt at 100° F. |
| Color_____ | Less than 2.0 |
| Cold test_____ | Below 35° F. |
| Flash_____ | Above 300° F. |
| Unsaturates_____ | Below 10% |

The gravity only serves to indicate the field of origin and consequently its chemical constitution. The saturated chain compounds, paraffins, have the least solubility in castor oil and therefore serve best as lubricants. The higher the gravity, the more saturated the oil, generally speaking. Unsaturated and cyclic compounds are undesirable because of their effect to increase miscibility of castor oil and the mineral oil. For this reason, petroleum oil is preferred to shale oil and Pennsylvania oils to Mid-Continent or Mexican oils. However, quite satisfactory preparations have been made using Mid-Continent oils of about 29° Bé. gravity. The viscosity, likewise, may vary considerably. A satisfactory polish may be made using Miner's oil and also by using oils of 100 secs. viscosity. (Saybolt at 100° F.)

The effect of the mineral spirits is to cut the viscosity of the mineral oil temporarily allowing more cleaning action until it evaporates, after which the substantially non-volatile mineral oil remains.

As appears in the formulae, a small amount of emulsifier is employed to stabilize the dispersion of the oils in water.

Gelatine and gums aid in the stabilization of the emulsion under certain rigorous conditions such as hot and freezing temperatures.

Ammonia combines readily with some of the free acids, aldehydes and lactones to form soaps and other surface active compounds to stabilize the emulsion. Triethanolamine is very similar to ammonia in its reaction and is used to replace it to give greater stability but is much more effective if fatty acids (oleic acid, etc.) are added to promote quicker reaction.

Preferably, however, the soap of caustic potash and oleic acid is employed as the emulsifier because of better stability obtained.

Thus, although the specific use of a type of soap, i. e., a compound of a basic material and a fatty acid is mentioned as a stabilizer for the emulsion, it should be understood that it would not be departing from the spirit of our invention to stabilize the dispersion with other colloiding materials such as sulphated fatty alcohols, dispersions of casein in alkali, vegetable gums or gelatine.

The orthodichlorbenzene is an efficient solvent for tar and road oil and helps to clean such materials from the finish, and to disperse them in the mineral oil, which is largely absorbed by the polishing pad.

Although the specific use of ortho-dichlorbenzene is mentioned in the preferred formula, other material of high solvent power for tar, wax or grease, which is water insoluble, but miscible with petroleum derivatives would fulfill the spirit of the invention. Such materials would embrace other halogenated hydrocarbons such as para-dichlor-benzene, tetra and/or hexahydro naphthalene, solvent naphtha, or pine oil, or mixtures of any of these types of materials. Oil of citronella substitute is employed for overcoming the unpleasant odor of the castor oil.

In one process for making my product, I pump all the measured water and the triethanolamine into the emulsifier or preliminary mixer. In another tank, the light red oil, solvent, orthodichlorbenzene, perfume, pale blown castor oil and spindle oil are mixed. After mixing these, they are then pumped up into the emulsifier and emulsified with the water while flowing in.

In the product using caustic potash as emulsifying agent, the method of manufacture is reversed; that is, all of the oils are first mixed and pumped into the emulsifier and then the water containing the caustic potash is pumped into the mixer containing the oils while mixing. This is a definite improvement for stability inasmuch as it itself serves in the mixing. The oil normally is on the external phase until approximately 50% of the water has been admitted. Then automatically the phase itself inverts, placing the oil as internal phase and water as external phase. Although this formula gives a much more stable product it is improved up from a stability standpoint as well as increasing the viscosity by incorporating gums.

This is done by mixing powdered gum arabic and powdered gum tragacanth in the ratio of three-fourths arabic and one-fourth tragacanth, into the oil mixture so that they would be well dispersed and each particle separated. Because of being insoluble the oil, when the water is pumped into this oil mixture and comes in contact with each particle of gum, instead of agglomerates of gums, the maximum dispersion of the gums almost instantly, as well as the maximum viscosity are achieved.

From the mixer, the emulsion is carried to the homogenizer where the emulsion is carried through adjustable valves in a homogenizer by pressure pumps developing pressures up to four thousand pounds per square inch, breaking up the oil globules into minute particles. This pressure is governed by the opening between the valve and the valve seat. The closer the valve is seated, the higher the pressure and theoretically the smaller the oil globule.

I have discovered that most satisfactory results both from the point of view of creaming and from economy of operation are apparent at a pressure in a homogenizer in the order of two thousand pounds per square inch, either in a single or a series of successive stages.

From the homogenizer, the polish is carried to the storage tank and thence to the filling machines.

Heretofore, in using colloid mills, I have found it next to impossible to reduce the oil globules below an average particle size of 5 mu, whereas part of the same batch of polish that had been processed through the colloid mill was then processed through the homogenizer and I found that at 2000 pounds per square inch the greater percentage of the oil globules was invisible and there were very few approaching 5 mu.

The homogenizer breaks up the particles into a cream, increasing the stability of the emulsion to such an extent that I have found that I can maintain a state of suspension of a bottle of our polish lying on the shelf undiluted for many months.

From the above, it will now be clear that my novel polish has many possible modifications without departing from the spirit of this invention.

This is a continuation-in-part of my application Serial No. 738,297, filed August 3, 1934, which will mature into Patent No. 2,136,402 on November 15, 1938.

I claim:

1. A rubbing polish composition in the form of an oil in water emulsion comprising water as a continuous phase and a petroleum distillate as a discontinuous phase, and dispersed in the petroleum distillate castor oil and a resin, the resin being soluble in the castor oil but insoluble in the petroleum distillate and in the water.

2. A rubbing polish composition in the form of an oil in water emulsion comprising water as a continuous phase and a petroleum distillate as a discontinuous phase, and dispersed in the petroleum distillate castor oil and a natural resin, the resin being soluble in the castor oil but insoluble in the petroleum distillate and in the water.

3. A rubbing polish composition in the form of an oil in water emulsion comprising water as a continuous phase and a petroleum distillate as a discontinuous phase, and dispersed in the petroleum distillate a resin, the resin being insoluble in the petroleum distillate and insoluble in the water, the resin being adapted to be carried and deposited onto the surface to be polished.

4. A rubbing polish composition in the form of an oil in water emulsion comprising water as a continuous phase and a petroleum distillate as a discontinuous phase, and dispersed in the petroleum distillate castor oil and a resin, the resin being soluble in the castor oil but insoluble in the petroleum distillate and in the water, said polish emulsion being homogenized to render it stable.

5. A rubbing polish composition in the form of an oil in water emulsion comprising water as a continuous phase and a petroleum distillate as a discontinuous phase, and dispersed in the petroleum distillate a resin, the resin being insoluble in the petroleum distillate and insoluble in the water, the resin being adapted to be carried and deposited onto the surface to be polished, said polish emulsion being homogenized to render it stable.

6. A rubbing polish composition in the form of an oil in water emulsion comprising water as a continuous phase and a petroleum distillate as a discontinuous phase, and dispersed in the petroleum distillate castor oil and a resin, the resin being soluble in the castor oil but insoluble in the petroleum distillate and in the water, the percentages of the resin with relation to the castor oil being from 10–35 per cent of resin to 90–65 per cent of castor oil.

JOSEPH A. TUMBLER.